United States Patent
Tazawa

(10) Patent No.: US 7,843,159 B2
(45) Date of Patent: Nov. 30, 2010

(54) MOTOR CONTROLLER

(75) Inventor: Toru Tazawa, Osaka (JP)

(73) Assignee: Panasonic Corporation, Osaka (JP)

(\*) Notice: Subject to any disclaimer, the term of this patent is extended or adjusted under 35 U.S.C. 154(b) by 400 days.

(21) Appl. No.: 12/136,282

(22) Filed: Jun. 10, 2008

(65) Prior Publication Data

US 2008/0309279 A1 Dec. 18, 2008

(30) Foreign Application Priority Data

Jun. 14, 2007 (JP) ............................. 2007-157222

(51) Int. Cl.
*G05B 5/01* (2006.01)
(52) U.S. Cl. ...................... 318/619; 318/607; 318/615; 318/616
(58) Field of Classification Search .............. 318/606, 318/607, 611, 615, 616, 617, 619, 620, 621, 318/622
See application file for complete search history.

(56) References Cited

U.S. PATENT DOCUMENTS

| | | | |
|---|---|---|---|
| 4,636,700 A * | 1/1987 | Moore et al. ................ 318/611 |
| 6,144,181 A * | 11/2000 | Rehm et al. ................ 318/629 |
| 6,936,990 B2 * | 8/2005 | Oyama et al. ............... 318/632 |
| 6,963,184 B2 * | 11/2005 | Carlson ...................... 318/460 |
| 7,068,923 B2 * | 6/2006 | Miyazaki .................... 388/806 |

FOREIGN PATENT DOCUMENTS

JP 2003-052188 2/2003

\* cited by examiner

*Primary Examiner*—Walter Benson
*Assistant Examiner*—Thai Dinh
(74) *Attorney, Agent, or Firm*—Wenderoth, Lind & Ponack, LLP.

(57) ABSTRACT

A motor controller includes: a notch filter arranged inside a control system; an oscillation frequency estimating section which estimates an oscillation frequency component in a motor; and a notch control section which controls a notch filter so as to change a notch frequency and a notch width. The notch control section changes a frequency between an oscillation frequency and a notch frequency set in a notch filter as a new notch frequency, while changing a notch width to a new notch width such that the notch width is larger after the change than before the change.

12 Claims, 5 Drawing Sheets

MOTOR CONTROLLER

FIELD OF THE INVENTION

The present invention relates to a motor controller for controlling a speed or a position of a motor as well as a load driven by the motor. The present invention particularly relates to a motor controller for suppressing mechanical resonance that occurs in the case of driving the load.

BACKGROUND OF THE INVENTION

Such a conventional motor controller for suppressing mechanical resonance is disclosed, for example, in Unexamined Japanese Patent Publication No. 2003-52188.

In the following, the conventional motor controller is described with reference to FIG. 6. FIG. 6 is a block diagram showing a system configuration of the conventional motor controller.

This conventional motor controller 100 is connected to motor 101 and speed detector 103. Motor 101 is connected with load 102. Further, speed detector 103 measures a speed of motor 101, and outputs speed detection signal ωra of motor 101.

As shown in FIG. 6, motor controller 100 includes speed control section 104, first notch filter 105, high-pass filter 107, second notch filter 108, notch control section 109, and torque control section 106.

Speed control section 104 receives input of speed command signal ωri and speed detection signal ωra, and sends output of torque command signal τ1i. First notch filter 105 receives input of torque command signal τ1i from speed control section 104, and sends output of torque command signal τ2i. High-pass filter 107 receives input of speed detection signal ωra, and sends output of oscillation component signal x not smaller than a cutoff frequency. Second notch filter 108 receives input of oscillation component signal x, and sends output of filtering result signal e. Notch control section 109 successively modifies notch frequencies fn of second notch filter 108 and first notch filter 105 so as to reduce an amplitude of filtering result signal e. Torque control section 106 receives input of torque command signal τ2i from first notch filter 105, to control motor 101.

Here, notch frequency fn of first notch filter 105 is obtained and set in the following manner.

First, oscillation component signal x not smaller than the cutoff frequency is extracted from inputted speed detection signal ωra by high-pass filter 107, and then outputted into second notch filter 108. Second notch filter 108 receives input of this oscillation component signal x, and sends output of filtering result signal e. Notch control section 109 successively modifies notch frequency fn of second notch filter 108 so as to reduce filtering result signal e from second notch filter 108. The setting of first notch filter 105 is changed such that notch frequency fn of this second notch filter 108 is set as the notch frequency of first notch filter 105.

In the conventional motor controller as thus configured, even when oscillation occurs due to mechanical resonance for some reason, the oscillation is suppressed since notch frequency fn of first notch filter 105 is successively modified so as to reduce an oscillation component, thereby suppressing the oscillation. For this reason, a system using the conventional motor controller comes into a stably controlled state.

However, the conventional motor controller detects an oscillation component due to oscillation, and then changes a notch frequency. Therefore, in a case where a resonance frequency frequently changes due to a conditional change such as a positional change of the load, the oscillation and the notch frequency are modified every time a deviation occurs between the resonance frequency and the notch frequency, causing a problem of preventing smooth movement.

For example, in the case of an apparatus in which a load position is changed by means of a motor, the resonance frequency changes significantly between a state where the load is close to the motor and a state where the load is far from the motor. When the load is reciprocated in such an apparatus, the resonance frequency of the apparatus changes significantly. Therefore, every time the deviation occurs between the resonance frequency and the notch frequency, oscillation occurs, though for a short period of time, and a behavior of modifying the notch frequency is repeated.

SUMMARY OF THE INVENTION

In order to solve the above problem, a motor controller of the present invention includes a control system that feedback-controls a moving operation of a moving section provided in a motor through the use of a detected moving amount of the moving section, and also includes:

a notch filter which is arranged inside the control system and attenuates a signal component of a nearby frequency in accordance with a notch width with a notch frequency put at a center in an input signal;

an oscillation frequency estimating section which estimates an oscillation frequency component in the motor from the moving amount; and a notch control section which controls the notch filter so as to change the notch frequency and the notch width in accordance with an estimation result of the oscillation frequency estimating section. Further, when determining that the oscillation frequency estimated by the oscillation frequency estimating section differs from the notch frequency set in the notch filter, the notch control section changes a frequency between the oscillation frequency and the notch frequency set in the notch filter as a new notch frequency of the notch filter, while changing the notch width to a new notch width such that the notch width becomes larger after the change than before the change.

With such a configuration, for example, even when a resonance frequency of the apparatus changes significantly in accordance with the load state, the notch control section controls the notch filter to change the notch width so as to attenuate a signal component of the original notch frequency and a signal component of the estimated oscillation frequency. Therefore, the motor controller of the present invention is capable of suppressing short-time oscillation, which occurs due to a significant change in resonance frequency of the apparatus, and is thus capable of constantly and stably controlling the motor.

DETAILED DESCRIPTION OF THE PREFERRED EMBODIMENT

In the following, embodiments of the present invention are described with reference to drawings.

First embodiment

Figure 1:
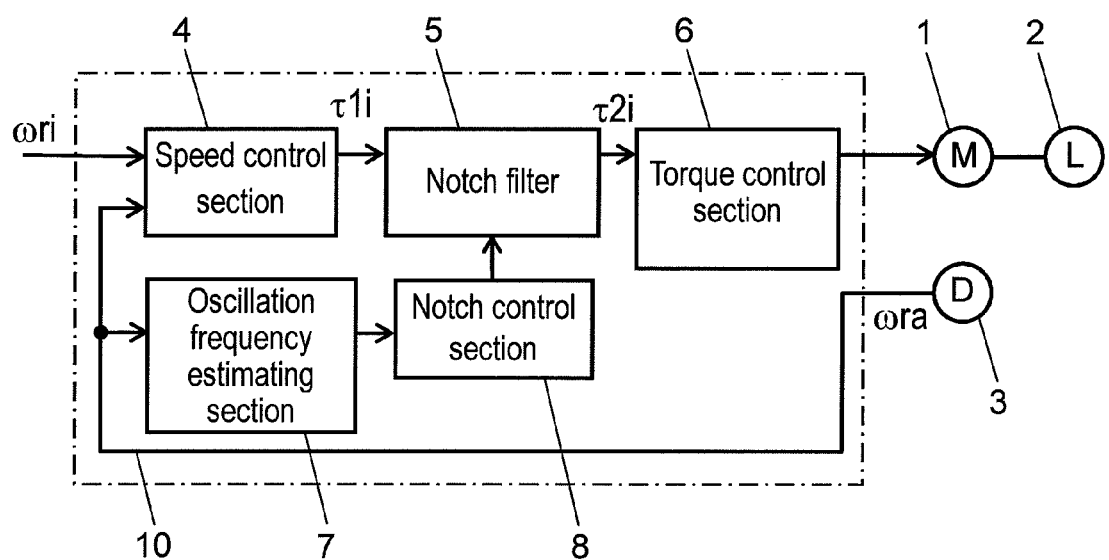
FIG. 1 shows a block diagram of a motor controller according to a first embodiment of the present invention.

FIG. 1 is a block diagram of a motor controller according to a first embodiment of the present invention.

Motor controller 10 according to the first embodiment of the present invention is connected to motor 1 and speed detector 3. Motor 1 is connected with load 2. Further, speed detector 3 measures a rotational speed of a moving element (not shown) provided inside motor 1, and outputs speed detection signal ωra showing a speed amount in accordance with the rotational speed. It is to be noted that in the present embodiment, a description is given by taking an example of speed detector 3 detecting an amount of rotational speed of the moving element as a moving amount of moving section of motor 1 as described above.

As shown in FIG. 1, motor controller 10 includes speed control section 4, notch filter 5, oscillation frequency estimating section 7, notch control section 8, and torque control section 6.

Speed command signal ωri showing a speed command value and speed detection signal ωra detected by speed detector 3 are inputted into speed control section 4. Speed control section 4 calculates a deviation amount between speed command signal ωri and speed detection signal ωra. Based upon this deviation amount, speed control section 4 generates torque command signal τ1i for controlling the deviation amount to 0, and outputs torque command signal τ1i. Specifically, speed control section 4 calculates, for example, a difference value between speed command signal ωri and speed detection signal ωra, and outputs a result of proportionally integrating the difference value as torque command signal τ1i.

Torque command signal τ1i is inputted from speed control section 4 into notch filter 5. Notch filter 5 is a filter for abruptly attenuating a signal component having a frequency included in the input signal with a specific frequency put at a center. This specific frequency is referred to as a notch frequency, and a width of a nearby frequency to be attenuated is referred to as a notch width. Notch filter 5 receives input of torque command signal τ1i outputted from speed control section 4, and sends output of new torque command signal τ2i.

Torque command signal τ2i outputted from notch filter 5 is inputted into torque control section 6. Torque control section 6 controls motor 1 such that motor 1 outputs a target torque.

As thus described, motor controller 10 is constituted of a speed control system that feedback-controls a moving operation of a moving element such that a rotational speed of the moving element becomes a rotational speed in accordance with speed command signal ωri through the use of speed detection signal ωra showing a moving amount of the moving element which was detected by speed detector 3. Motor controller 10 is configured such that notch filter 5 is arranged inside this speed control system.

Speed detection signal ωra is also inputted from speed detector 3 into oscillation frequency estimating section 7. Oscillation frequency estimating section 7 estimates an oscillation frequency component in motor 1 from speed detection signal ωra. Namely, oscillation frequency estimating section 7 extracts an oscillation frequency component which appears in inputted speed detection signal ωra, such as an oscillation frequency component of mechanical resonance that occurs when load 2 is driven by motor 1, and estimates oscillation frequency fo of the extracted component. Oscillation frequency estimating section 7 notifies notch control section 8 of information regarding estimated oscillation frequency fo.

Notch control section 8 sets and changes parameters including notch frequency fn and notch width Bn of notch filter 5. In particular, notch control section 8 controls notch filter 5 such that notch frequency fn and notch width Bn are changed in accordance with the estimation result of oscillation frequency estimating section 7. Namely, notch control section 8 receives input of information regarding oscillation frequency fo estimated in oscillation frequency estimating section 7, and based upon this information, notch control section 8 performs an operation so as to change notch frequency fn and notch width Bn of notch filter 5. Further, notch control section 8 also performs an operation of switching the state of notch filter 5 between a valid state and invalid state.

It is to be noted that the valid state of notch filter 5 is a state of removing from the input signal the signal component of the frequency with the notch frequency put at the center and then outputting the resulting signal, and the invalid state is a state of outputting the input signal as it is.

In the present embodiment, when determining that oscillation frequency fo notified from oscillation frequency estimating section 7 and notch frequency fn set in notch filter 5 are different, notch control section 8 controls notch filter 5 in the following manner. Namely, notch control section 8 changes a frequency between oscillation frequency fo and the currently set notch frequency fn as new notch frequency fn' of the notch filter. Concurrently with this, notch control section 8 changes the notch width such that notch width Bn' after the change is larger than notch width Bn before the change. As a specific example of changing the notch frequency to new notch frequency fn', the notch frequency is changed to an average value of oscillation frequency fo and notch frequency fn, namely a notch frequency which satisfies: new notch frequency fn'=(fo+fn)/2. Further, the notch width is changed so as to satisfy: new notch width Bn'>Bn.

Motor controller 10 of the present embodiment is characterized in that notch control section 8 controls notch filter 5 in the manner as thus described. By the control of notch control section 8 on notch filter 5 in the manner as thus described, the signal component of original notch frequency fn and the signal component of oscillation frequency fo are controlled so as to be separately attenuated. It is thereby possible to suppress occurrence of short-time oscillation due to a significant change in resonance frequency of the apparatus. In such a manner, motor controller 10 ensures stabilization at the time of driving load 2 by motor 1.

Moreover, notch control section 8 outputs an alarm signal when determining that notch width Bn is not smaller than a prescribed value. It is thereby possible to prevent instability of control due to an extreme increase in notch width Bn. Namely, when notch width Bn is extremely increased, a phase characteristic of a frequency region lower than notch frequency fn deteriorates, resulting in instability of control. Hence a means for preventing an extreme increase in notch width Bn is necessary, and notch control section 8 is thus configured so as to output an alarm signal.

Next, operations of motor controller 10 are described, focusing on a process of notch control section 8 controlling notch filter 5.

Figure 2:
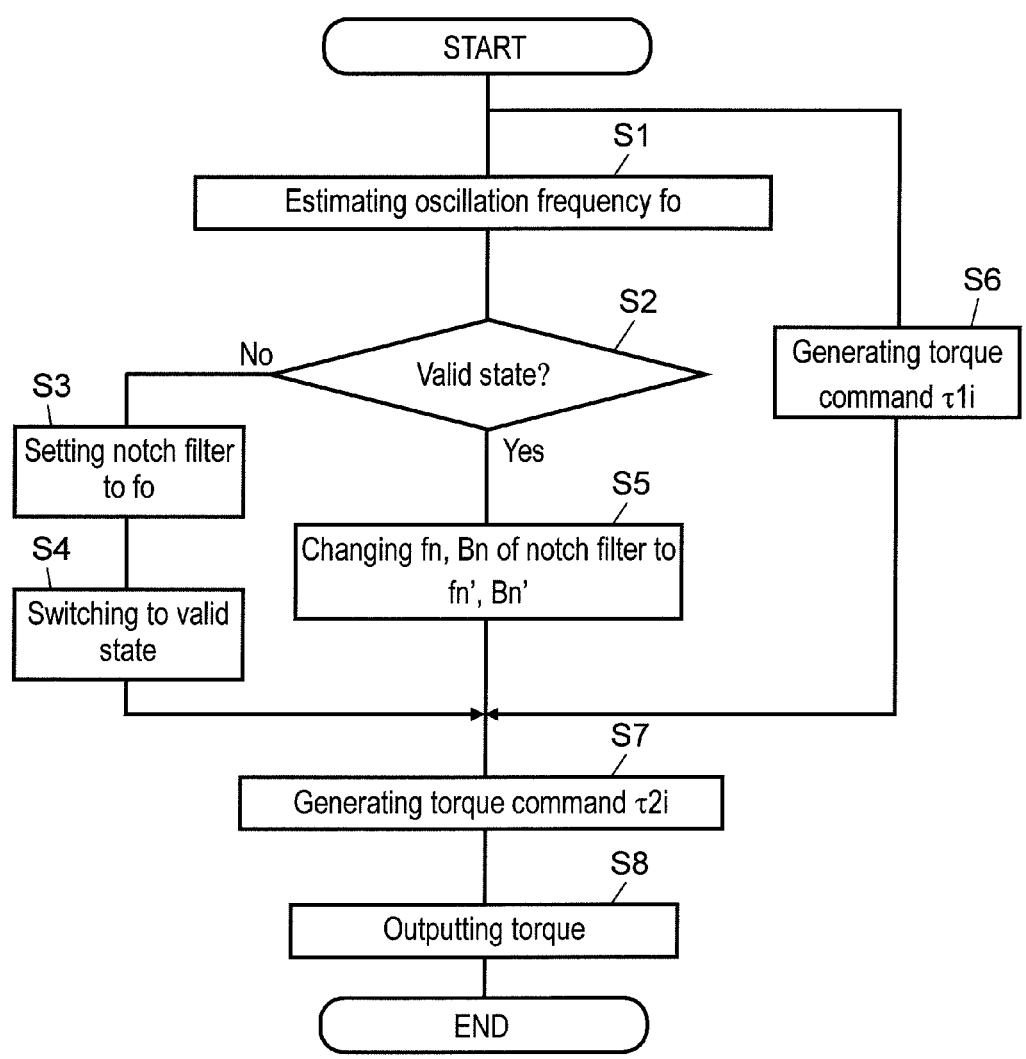
FIG. 2 shows a flowchart showing a procedure of control of the same motor controller.

FIG. 2 is a flowchart showing a procedure of control of motor controller 10. The process of notch control section 8 controlling notch filter 5 is described with reference to FIG. 2.

First, speed detection signal ωra detected by speed detector 3 is inputted into oscillation frequency estimating section 7, and oscillation frequency fo is estimated (Step S1).

At this time, notch control section 8 confirms whether notch filter 5 is in the valid state or the invalid state (Step S2).

When notch filter 5 is in the invalid state, notch control section 8 takes estimated oscillation frequency fo as notch frequency fn, and sets this notch frequency fn in notch filter 5 (Step S3). Notch control section 8 then switches the state of notch filter 5 to the valid state (Step S4).

On the other hand, when notch filter 5 is in the valid state, a frequency between notch frequency fn of notch filter 5 and estimated oscillation frequency fo is set as new notch frequency fn' of notch filter 5. At this time, notch width Bn is changed to notch width Bn' (Bn'>Bn) such that a signal component of original notch frequency fn and a signal component of estimated oscillation frequency fo are attenuated (Step S5).

New notch frequency fn' set in this Step S5 is, for example as described above, set to an average value between original notch frequency fn and estimated oscillation frequency fo. This enables suppression of short-time oscillation due to a significant change in resonance frequency of the apparatus. This allows constant and stable control of motor 1.

Figure 3:
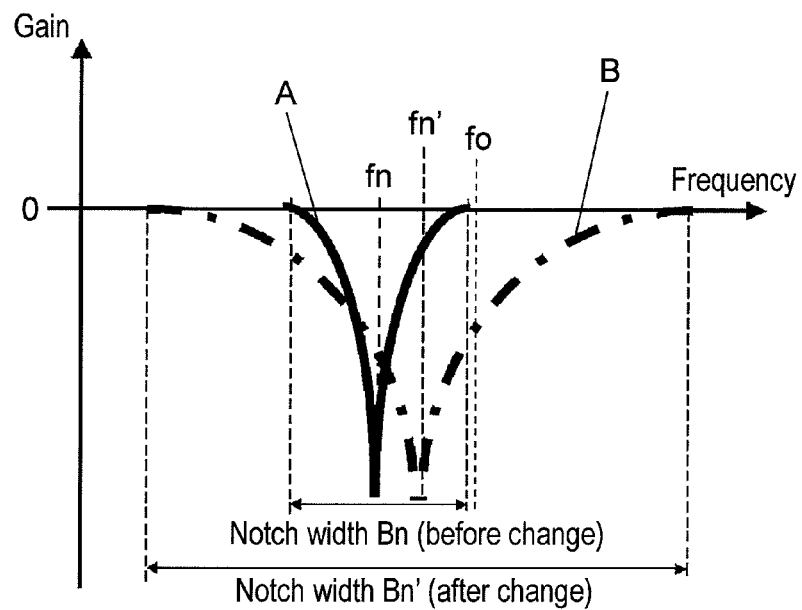
FIG. 3 shows a view of an example of a frequency characteristic of the notch filter.

FIG. 3 is a view showing an example of a frequency characteristic of notch filter 5, where an abscissa axis indicates a frequency and an ordinate axis indicates a gain of notch filter 5. Further, FIG. 3 shows characteristics of the notch frequency and the notch width of notch filter 5 by comparison between those before the change and those after the change.

Notch filter 5 before the change is set so as to remove a signal component of a frequency with original notch frequency fn put at a center, as indicated by curve A of FIG. 3. On the other hand, notch filter 5 after the change is set so as to be able to remove a signal component of the frequency band having a larger width than that of curve A, with new notch frequency fn' put at a center. Further, as compared with curve A, it is possible in the case of curve B to increase suppression of the gain with respect to the frequency near the notch frequency.

Therefore, after being changed so as to have characteristics as indicated by curve B, notch filter 5 has a suppression effect on an oscillation component before the change, and also has a suppression effect on an oscillation component having newly appeared. For example, in the case of FIG. 3, a new frequency characteristic of notch filter 5 which is indicated by curve B has a suppression effect on a signal component of notch frequency fn corresponding to the oscillation component before the change, and also has a suppression effect on a signal component of oscillation frequency fo corresponding to the oscillation component having newly appeared.

Thereby, for example in a case where the resonance frequency frequently changes due to a conditional change such as a positional change of load 2, the notch frequency and the notch width with that change taken into account is set, thereby allowing prevention of short-time oscillation. Hence it is possible to make motor 1 and load 2 that is driven by motor 1 operate stably and smoothly.

Moreover, as shown in FIG. 2, concurrently with above Steps S1 to S5, speed detection signal ωra detected by speed detector 3 is inputted into speed control section 4, to generate torque command signal τ1i (Step S6).

As thus described, torque command signal τ1i outputted from speed control section 4 is inputted into notch filter 5, and torque command signal τ2i with the oscillation component removed by notch filter 5 is generated (Step S7).

Subsequently, torque command signal τ2i is inputted into torque control section 6, and a torque is outputted into motor 1 (Step S8).

It is to be noted that in the present embodiment, notch control section 8 is configured so as to output an alarm signal when determining that the notch width is not smaller than a prescribed value.

The reason for this is as follows. Namely, when the notch width becomes too large, a phase characteristic of a frequency region lower than the notch frequency deteriorates, thereby to destabilize the control characteristic. Therefore, notch control section 8 is configured so as to output the alarm signal for drawing attention of an operator when determining that the notch width is not smaller than the prescribed value.

Here, the notch width being not smaller than the prescribed value is attributed to that the apparatus comes into a state where oscillation does not stop even with increase in notch width. When control of motor 1 is continued in such a state where oscillation remains unstopped, the control gradually comes into an unstable state, which may cause damage to motor 1 and load 2. In this case, stabilization is not possible only by means of notch filter 5.

Therefore, notch control section 8 may be configured to have a function of stopping an increase in notch width. Furthermore, the notch control 8 may have a function of stopping the operation of motor controller 10 itself. It is thereby possible to safely stop the operation of the apparatus.

As described above, in the motor controller of the present embodiment, when determining that an oscillation frequency estimated by the oscillation frequency estimating section differs from a notch frequency set in the notch filter, the notch control section changes a frequency between the oscillation frequency and the notch frequency set in the notch filter as a new notch frequency, while changing a notch width to a new notch width such that the notch width is larger after the change than before the change. Accordingly, the notch filter is controlled such that a signal component of the original notch frequency and a signal component of the estimated oscillation frequency are separately attenuated. Therefore, according to the motor controller of the present embodiment, it is possible to suppress short-time oscillation due to a significant change in resonance frequency of the apparatus, thereby allowing constant and stable control of motor 1.

Second embodiment

In the following, motor controller 20 according to a second embodiment of the present invention is described with reference to drawings.

Figure 4:
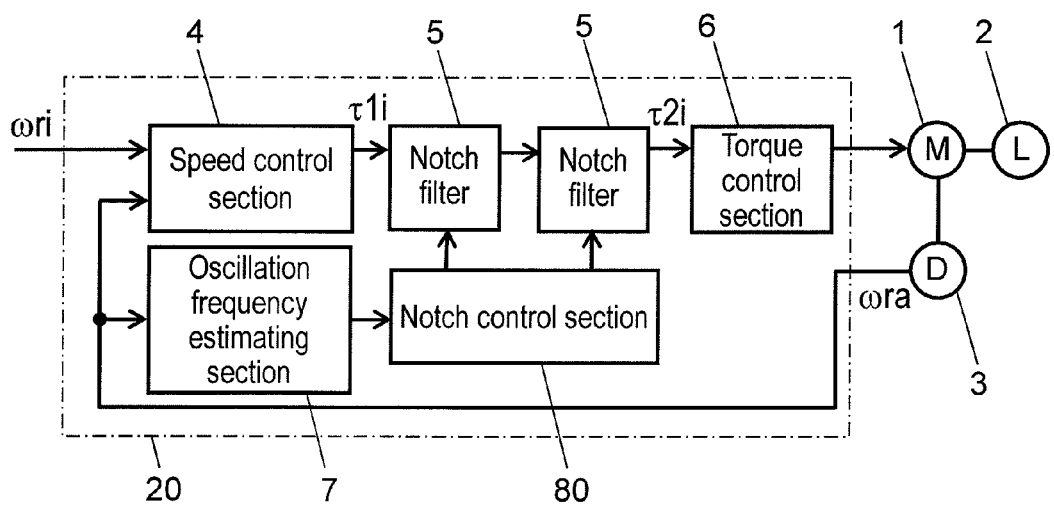
FIG. 4 shows a block diagram of a motor controller according to a second embodiment of the present invention.

FIG. 4 is a block diagram of motor controller 20 according to the second embodiment of the present invention.

In FIG. 4, the same constituents as those of motor controller 10 according to the first embodiment are provided with the same numerals, and detailed descriptions thereof are omitted.

In comparison with the first embodiment, motor controller 20 includes a plurality of notch filters 5, and also includes notch control section 80 that controls these notch filters 5. Notch control section 80 is capable of changing a notch frequency and a notch width of each of the plurality of notch filters 5. Further, notch control section 80 is capable of switching the state of the plurality of notch filters 5 between the valid state and the invalid state. It is to be noted that in the present embodiment, as shown in FIG. 4, a description is made by taking an example of provision of two notch filters 5, but for example, the motor controller 20 may be configured to include more than two notch filter 5.

Motor controller 20 of the present embodiment is configured as described above, and characteristic in that, when determining that oscillation frequency fo estimated by oscillation frequency estimating section 7 differs from the notch frequency set in each of notch filters 5, notch control section 80 selects out of notch filters 5 notch filter 5 in which a notch frequency closest to oscillation frequency fo is set, and changes the notch frequency and the notch width of the selected notch filter 5 to a new notch frequency and a new notch width.

Next, an operation of motor controller 20 is described, focusing on a process of notch control section 80 controlling each of notch filters 5.

Figure 5:
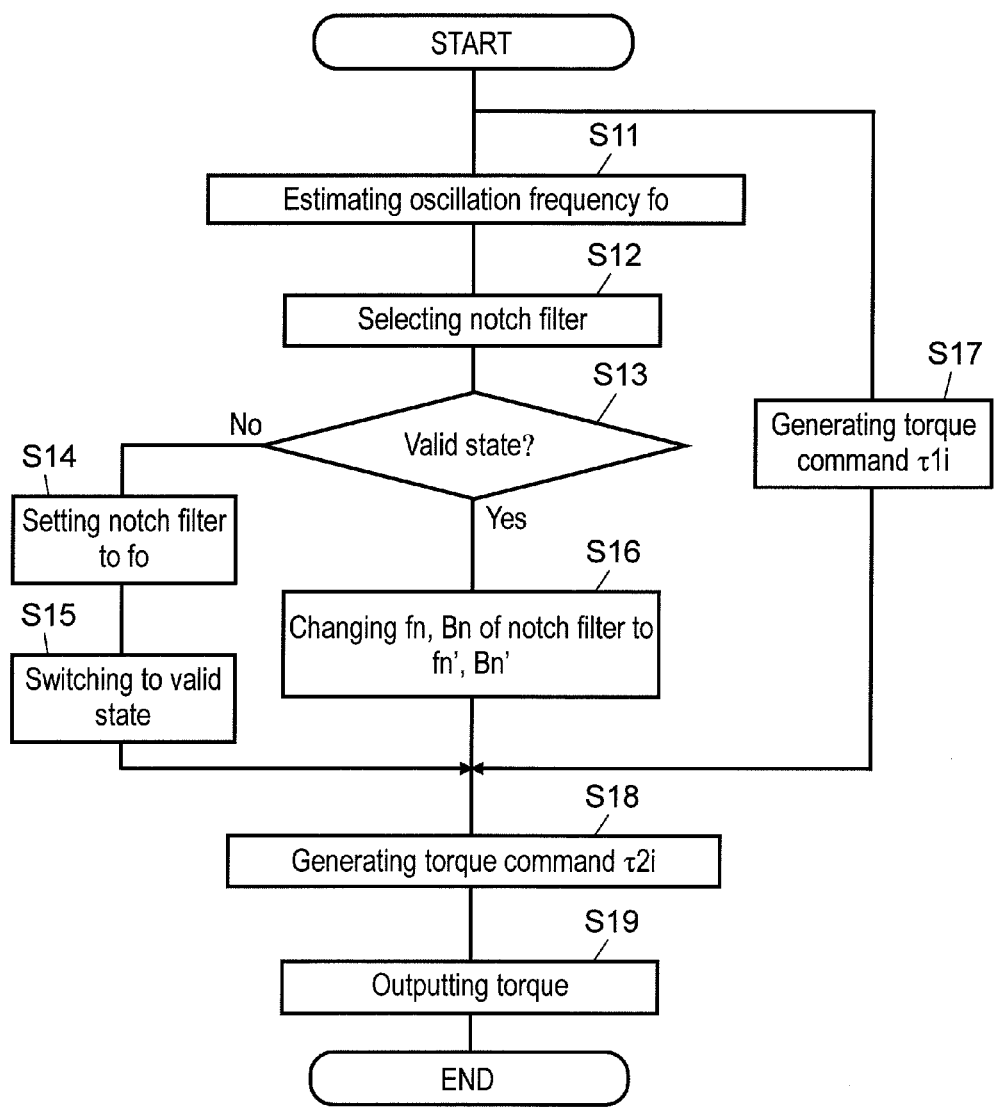
FIG. 5 shows a flowchart of a procedure of control of the same motor controller.
Figure 6:
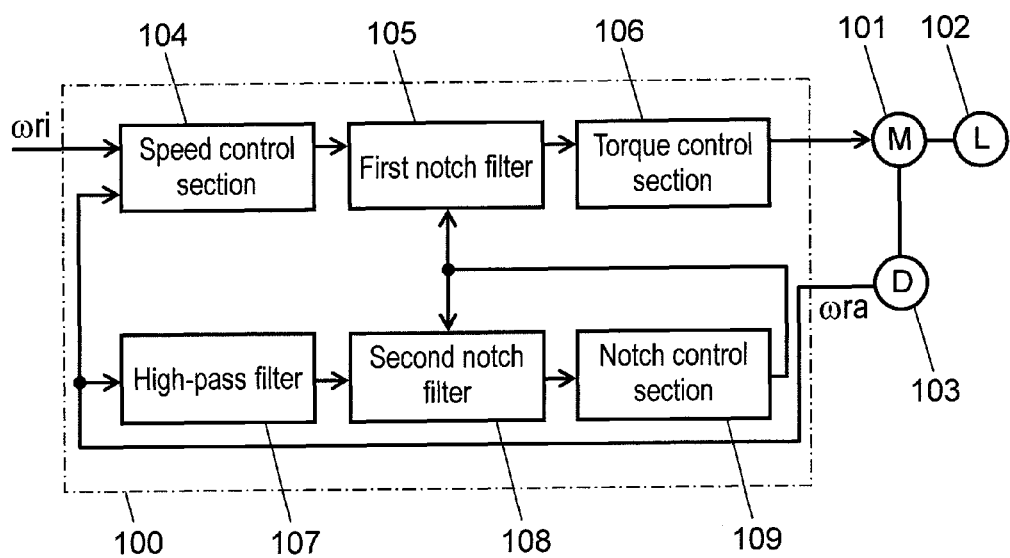
FIG. 6 shows a block diagram of a system configuration of a conventional motor controller.

FIG. 5 is a flowchart showing a procedure of control of motor controller 20. In the following, the process of notch control section 80 controlling each of notch filters 5 is described with reference to FIG. 5.

First, speed detection signal ωra detected by speed detector 3 is inputted into oscillation frequency estimating section 7, and oscillation frequency fo is estimated (Step S11).

Notch control section selects out of the plurality of notch filters 5 notch filter 5 in which a frequency closest to estimated oscillation frequency fo is set as notch frequency fn (Step S12).

At this time, notch control section 80 confirms whether the selected notch filter 5 is in the valid state or the invalid state (Step S13).

When notch filter 5 is in the invalid state, notch frequency fn is set to estimated oscillation frequency fo (Step S14). The selected notch filter 5 is then switched to the valid state (Step S15).

On the other hand, when the selected notch filter 5 is in the valid state, a frequency between notch frequency fn of this notch filter 5 and estimated oscillation frequency fo is set as new notch frequency fn' of this notch filter 5. At this time, notch width Bn is changed to notch width Bn' (Bn'>Bn) such that a signal component of original notch frequency fn and the signal component of estimated oscillation frequency fo are attenuated (Step S16).

New notch frequency fn' set in this Step S16 is, for example as described in the first embodiment, set to an average value between original notch frequency fn and estimated oscillation frequency fo. This enables suppression of short-time oscillation due to a significant change in resonance frequency of the apparatus. This allows constant and stable control of motor 1.

Moreover, as shown in FIG. 5, concurrently with above Steps S11 to S16, speed detection signal ωra detected by speed detector 3 is inputted into speed control section 4, to generate torque command signal τ1$i$ (Step S17).

As thus described, torque command signal τ1$i$ outputted from speed control section 4 is inputted into notch filter 5, and torque command signal τ2$i$ with the oscillation component removed by each notch filter 5 is generated (Step S18).

Subsequently, torque command signal τ2$i$ is inputted into torque control section 6, and a torque is outputted into motor 1 (Step S19).

It is to be noted that, also in the present embodiment as in the first embodiment, notch control section 80 may be configured so as to output an alarm signal, have a function of stopping an increase in notch width, or have a function of stopping the operation of motor controller 20 itself, when determining that the notch width is not smaller than a prescribed value.

As thus described, in the motor controller of the present embodiment, when determining that the oscillation frequency estimated by the oscillation frequency estimating section differs from the notch frequency set in each of the notch filters, the notch control section selects out of the notch filters a notch filter in which a notch frequency closest to the oscillation frequency is set, and changes a frequency between the oscillation frequency and the notch frequency set in the selected notch filter as a new notch frequency of the selected notch filter, while changing a notch width to a new notch width such that the notch width is larger after the change than before the change. Therefore, the selected notch filter is controlled such that a signal component of the original notch frequency and a signal component of the estimated oscillation frequency are separately attenuated. Accordingly, the motor controller of the present embodiment is also capable of suppressing short-time oscillation due to a significant change in resonance frequency of the apparatus, thereby allowing constant and stable control of the motor.

It is to be noted that in each of the foregoing embodiments, the description was made by taking the example of the speed control system that detects a speed of the moving element and feedback-controls the moving operation of the moving element through the use of the detected speed amount. However, a positional control system may be employed which detects a position of the moving element and feedback-controls the moving operation of the moving element through the use of the detected positional information. Further, in the case of the positional control system, it may be configured so as to estimate the oscillation frequency from the detected positional information. Moreover, it may be configured so as to separately capture a signal for estimating the oscillation frequency, other than a signal for detecting speed or a position.

Further, in each of the foregoing embodiments, the example of the motor including the moving element that rotationally operates as the moving section was described. However, the motor may be one that performs a moving operation other than rotation, such as a linear motor.

Further, in each of the foregoing embodiments, the configuration to output an alarm signal and the configuration to stop an increase in notch width in the case of the notch width being larger than a prescribed value are adopted, and concurrently with these, as a configuration to decrease a control gain of the control system, a configuration to bring the motor into a stable state may also be adopted.

Further, in each of the foregoing embodiments, the new notch frequency of the notch filter was described as the average value of the original notch frequency and the estimated oscillation frequency. However, the new notch frequency may be any value so long as the frequency between the original notch frequency and the estimated oscillation frequency is set as the new notch frequency of the notch filter such that attenuation of the original notch frequency and the estimated oscillation frequency is sufficiently ensured.

Further, in each of the foregoing embodiments, the description was made by taking the example of the embodiment where the motor controller of the present invention is made up of, for example, the functional block as shown in FIG. 1. However, for example, the motor controlling method may be one in which a process in each block is realized by execution of steps in accordance with a procedure. Specifically, the method may be configured such that a program for sequentially executing steps corresponding to a process of each block is stored into a memory or the like, and for example, a CPU such as a microprocessor sequentially reads programs stored in the memory, and executes the process in accordance with the read program.

As thus described, the motor controller according to the present invention is capable of suppressing short-time oscillation due to a significant change in resonance frequency of the apparatus, and is thus capable of constantly and stably controlling a motor. Therefore, the motor controller is suitable for a motor controller using a motor, such as a component mounting machine or a semiconductor manufacturing machine, and particularly for a motor controller that drives a device where a resonance frequency is frequently changes due to a load state.

What is claimed is:

1. A motor controller, comprising a control system that feedback-controls a moving operation of a moving section provided in a motor through the use of a detected moving amount of the moving section, the motor controller comprising:
   a notch filter which is arranged inside the control system and attenuates a signal component of a nearby frequency in accordance with a notch width with a notch frequency put at a center in an input signal;
   an oscillation frequency estimating section which estimates an oscillation frequency component in the motor from the moving amount; and
   a notch control section which controls the notch filter so as to change the notch frequency and the notch width in accordance with an estimation result of the oscillation frequency estimating section,
   wherein, when determining that the oscillation frequency estimated by the oscillation frequency estimating section differs from the notch frequency set in the notch filter, the notch control section changes a frequency between the oscillation frequency and the notch frequency set in the notch filter as a new notch frequency of the notch filter, while changing the notch width to a new notch width such that the notch width becomes larger after the change than before the change.

2. The motor controller according to claim 1, comprising a plurality of the notch filters,
   wherein, when determining that the oscillation frequency estimated by the oscillation frequency estimating section differs from the notch frequency set in each of the notch filters, the notch control section selects out of the notch filters a notch filter in which a notch frequency closest to the oscillation frequency is set, and changes the notch frequency and a notch width of the selected notch filter to the new notch frequency and the new notch width.

3. The motor controller according to claim 2,
   wherein the notch control section
   has a function of switching a state of the notch filter between a valid state and an invalid state,
   sets the oscillation frequency as the notch frequency of the notch filter when the notch filter is in the invalid state, and
   changes the notch frequency and the notch width of the notch filter to the new notch frequency and the new notch width when the notch filter is in the valid state.

4. The motor controller according to claim 2, wherein the notch control section outputs an alarm signal when determining that the notch width is not smaller than a prescribed value.

5. The motor controller according to claim 2, wherein the notch control section stops changing the notch width when determining that the notch width is not smaller than a prescribed value.

6. The motor controller according to claim 2, wherein the notch control section stops an operation of the motor when determining that the notch width is not smaller than a prescribed value.

7. The motor controller according to claim 2, wherein the notch control section changes a control gain of the control system so as to decrease the control gain when determining that the notch width is not smaller than a prescribed value.

8. The motor controller according to claim 1,
   wherein the notch control section
   has a function of switching a state of the notch filter between a valid state and an invalid state,
   sets the oscillation frequency as the notch frequency of the notch filter when the notch filter is in the invalid state, and
   changes the notch frequency and the notch width of the notch filter to the new notch frequency and the new notch width when the notch filter is in the valid state.

9. The motor controller according to claim 1, wherein the notch control section outputs an alarm signal when determining that the notch width is not smaller than a prescribed value.

10. The motor controller according to claim 1, wherein the notch control section stops changing the notch width when determining that the notch width is not smaller than a prescribed value.

11. The motor controller according to claim 1, wherein the notch control section stops an operation of the motor when determining that the notch width is not smaller than a prescribed value.

12. The motor controller according to claim 1, wherein the notch control section changes a control gain of the control system so as to decrease the control gain when determining that the notch width is not smaller than a prescribed value.

* * * * *